United States Patent [19]
Widdowson

[11] 3,744,268
[45] July 10, 1973

[54] SUCTION THROTTLING VALVE FOR AUTOMOTIVE REFRIGERANT SYSTEM
[75] Inventor: Richard E. Widdowson, Dayton, Ohio
[73] Assignee: General Motors Corporation, Detroit, Mich.
[22] Filed: Mar. 6, 1972
[21] Appl. No.: 231,876

[52] U.S. Cl. ............................................. 62/217
[51] Int. Cl. .......................................... F25b 41/04
[58] Field of Search..................... 62/217, 218, 219, 62/225; 236/92

[56] References Cited
UNITED STATES PATENTS
3,296,816  1/1967  Weibel................................ 62/217
3,564,865  2/1971  Spencer.............................. 62/217

Primary Examiner—Meyer Perlin
Attorney—W. S. Pettigrew and J. C. Evans

[57] ABSTRACT

A controller for throttling the suction return from an evaporator to an engine driven compressor in an automotive air conditioning system having dual poppet valves operated in response to the condition of refrigerant at the inlet of the controller to produce a first relatively restricted flow of fluid from the evaporator to the compressor under conditions where the fluid conditions at the outlet of the evaporator are near a desired control point and wherein they are operated to produce a relatively unrestricted flow from the evaporator to the compressor when the evaporator has a high heat load imposed thereon.

4 Claims, 3 Drawing Figures

PATENTED JUL 10 1973

3,744,268

SUCTION THROTTLING VALVE FOR AUTOMOTIVE REFRIGERANT SYSTEM

This invention relates to controllers for regulating flow of refrigerant from the evaporator of an automotive air conditioning system to an engine driven compressor unit therein and more particularly to such a unit having means for sensing the refrigerant condition at the outlet of the evaporator to regulate valving components to prevent the pressure within the evaporator from being reduced below a point at which the evaporator temperature will be reduced below 32° F.

Automotive air conditioning systems include an engine driven compressor which will have a variable output in accordance with the speed of operation of the vehicle. To control temperature in such arrangements, various control arrangements have been proposed. One approach is to include an expansion valve between a condenser for cooling refrigerant from the compressor and the inlet of an evaporator. The evaporator has ambient air directed thereacross to be cooled by evaporation of refrigerant in the evaporator. The cooled air is directed into the passenger compartment of the vehicle. In such cases, the expansion valve will regulate the amount of refrigerant flow into the evaporator in accordance with temperature conditions at the evaporator. Under certain conditions of operation, however, the pressure within the evaporator can be reduced to a point where the surface temperature of the evaporator will be reduced below freezing. Under these conditions, any moisture in air being directed across the evaporator will freeze on the evaporator surface. If the condition is maintained for a long enough period of time, the evaporator can be blocked to prevent the passage of cooled air into the passenger compartment of the vehicle.

To prevent this condition from occurring a suction throttling valve or controller is located between the outlet of the evaporator and the inlet of the compressor of the automotive system. Such controllers include means for sensing the pressure condition at the outlet of the evaporator and when it is reduced below a point where the evaporator will freeze a valving component therein is moved to a throttle control position to restrict communication between the evaporator and compressor in order that the pressure level within the evaporator will be maintained above its freeze pressure. In the past, such valves have incorporated a close tolerance bore and sliding piston arrangement therein to produce a variable restriction of refrigerant flow between the evaporator and compressor. Such devices require close tolerances of manufacture.

An object of the present invention is to control pressure within an evaporator unit of an automotive air conditioning system by sensing the condition of refrigerant at the outlet of the evaporator and including means therein for operating a poppet valve device for producing staged fluid restrictions between the evaporator and compressor to increase evaporator cooling efficiency and to prevent the evaporator from freezing during system operation.

Still another object of the present invention is to eliminate close sliding tolerances in a suction throttling valve for maintaning a control pressure within the evaporator of an automotive air conditioning system by provision of dual poppet valves within the unit operated in response to first and second pressure conditions in the evaporator to produce a less restricted or a more restricted flow of fluid between the evaporator and the compressor inlet while maintaining the pressure within the evaporator above a level at which the evaporator will freeze.

These and other objects of the present invention are attained in one embodiment of the invention which includes a housing having an inlet and an outlet. Within the housing is located a pilot valve responsive to conditions of refrigerant in the outlet of the evaporator to control a movable valve carriage member into first and second control positions. When in the first control position, the carriage locates first and second poppet valves in a closed position to block fluid flow from the evaporator to the compressor. When the evaporator is subjected to a first heat load, the pilot valve responds to refrigerant conditions at the evaporator outlet to position the carriage in a second control position wherein one of the poppet valves is shifted to a position to open a first restricted flow path between the evaporator and compressor to compensate for a first predetermined pressure within the evaporator. Under higher load conditions, the pilot valve is responsive to the evaporator refrigerant outlet conditions to move the carriage to a third control position wherein the second poppet valve is moved to open a less restricted passageway between the evaporator and compressor to compensate for the greater heat load on the evaporator. The stepped control action of the first and second poppet valves establishes a pressure level within the evaporator to handle variable heat loads thereon and a pressure level wherein the temperature of the outer surface of the evaporator is continuously maintained above freezing to prevent the accumulation of a frost build-up thereon during system operation which might block the passage of cooled air into the vehicle passenger compartment.

Further objects and advantages of the present invention will be apparent from the following description, reference being had to the accompanying drawings wherein a preferred embodiment of the present invention is clearly shown.

Figure 1:
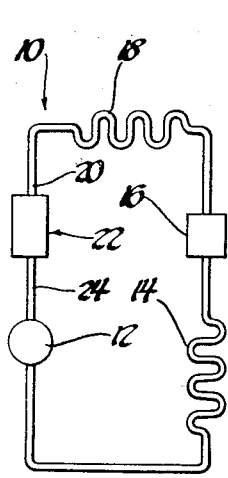
FIG. 1 is a diagrammatic view of an automotive air conditioning system including the present invention.
Figure 2:
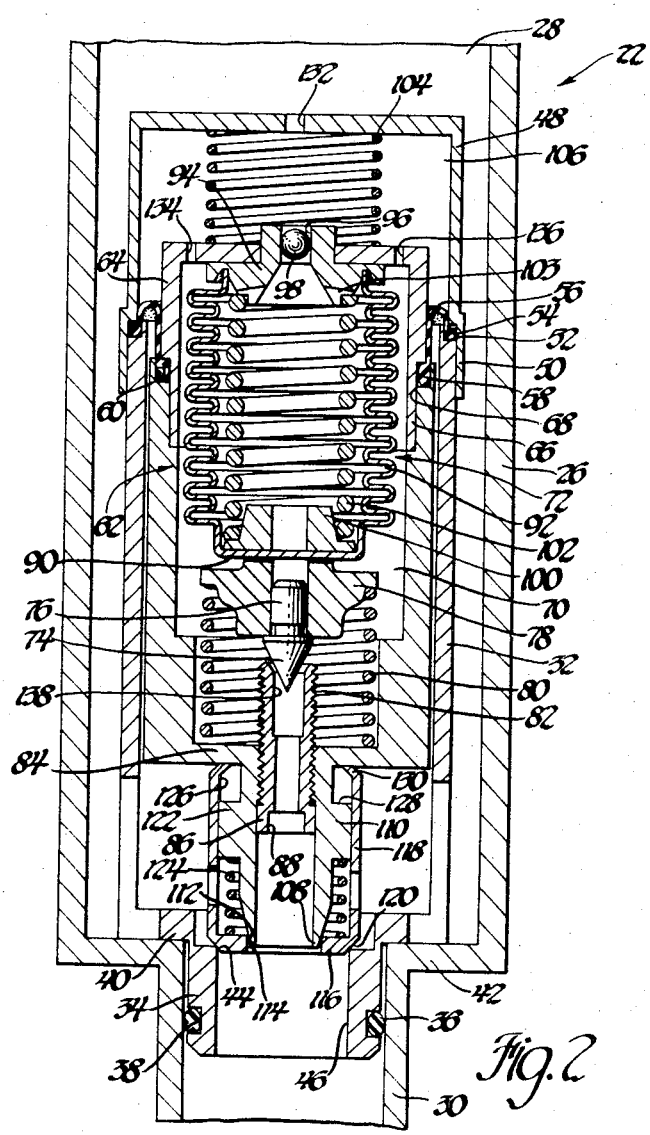
FIG. 2 is an enlarged view in vertical section of the suction throttling valve of the present invention.

Referring now to the drawings, in FIG. 1 an automotive air conditioning system 10 is illustrated including a compressor 12 having its outlet connected to a condenser 14. The condenser is connected to an expansion valve 16 which regulates the amount of refrigerant flowing through an evaporator 18 in accordance with the temperature of the evaporator.

The evaporator 18 has its outlet connected by a refrigerant tube 20 to a suction throttling valve 22 constructed in accordance with the present invention. The outlet of the valve 22 is connected by means of a return conduit 24 to the inlet of the compressor 12.

In these arrangements, the compressor 12 has a piston driven within a cylinder to compress refrigerant. It is discharged into the condenser 14 where it is cooled to liquid. The condensed high pressure refrigerant passes from the condenser 14 under the control of the expansion valve 16. Typically, the expansion valve 16 senses the temperature of the outlet of the evaporator 18 so that when the temperature thereof increases because of an additional heat load placed on the evaporator 18, more refrigerant will pass through the evaporator 18. The expansion valve 16 reduces the pressure of the refrigerant as it is directed into the evaporator 18.

In systems of this type both the heat load and the speed of operation of the compressor is highly variable. The compressor 12 is typically driven through a clutch mechanism directly from the engine of the vehicle and will have a speed of operation which is dependent upon the speed of operation of the vehicle. Because of this, when the vehicle is operating at high speed conditions and there is a low heat load on the evaporator, there can be conditions where the pressure within the evaporator is reduced below a pressure at which the evaporator temperature will be below 32° F. Under these conditions, any moisture in the ambient air passing across the evaporator can be deposited thereon in the form of a frost build-up. Under normal operation, the ambient air passes through the evaporator where it is cooled. It then passes into the passenger compartment for cooling it. However, if a sufficient frost build-up occurs on the outer surface of the evaporator, air flow will be blocked and the vehicle will no longer be properly conditioned even though the compressor 12 is still operating. In order to prevent such evaporator freeze, the valve 22 includes means for throttling refrigerant flow from the evaporator 18 to the inlet of the compressor 12.

More particularly, the suction throttling valve 22 includes a housing 26 having an inlet 28 and an outlet 30. The inlet 28 is connected to the refrigerant tube 20 from the evaporator outlet 18 and the outlet 30 is connected to the conduit 24 leading to the suction inlet of the compressor 12. Within the housing 26 is located a valve cage 32 having a depending tubular extension 34 thereon fit in the housing outlet 30. In the illustrated arrangement, the extension 34 is sealed with respect to the housing by means of a high pressure O-ring seal 36 supported in an extension groove 38 so as to be maintained in tight sealing engagement between it and the outlet 30.

The extension 34 depends from a base 40 which rests against an end member 42 on the housing 26. The base 40 includes an annular valve seat 44 therein surrounding a relatively unrestricted opening 46 through the extension 34.

The cage 32 has a cup-shaped member 48 supported on the top thereof. More particularly, the member 48 includes a flange 50 which fits over the outer upper end of the cage 32. Flange 50 has a peripheral recess 52 thereon in which is located a bead portion 54 of a rolling sleeve seal member 56.

The rolling sleeve seal member 56 has a second bead portion 58 thereon located within an internally recessed, open end 60 of a movable, valve carriage member 62. It is held in place therein by an inverted cup member 64 which has an open end 66 thereon fit within a bore 68 in the carriage member 62. The cup member 64 and carriage member 62 form a pressure control chamber 70 in which is located a condition responsive pilot valve mechanism 72.

The pilot valve mechanism 72 more particularly includes a needle valve 74 having a base portion 76 thereon fit within a valve holder 78.

A lower control spring 80 has one end thereof in engagement with the valve holder 78 and the opposite end thereof seated against the carriage member 62 around an externally threaded tubular valve seat member 82 threadably received in the base 84 of the carriage member 62. The valve seat member 82 has a head portion 86 with a socket 88 therein for a tool to axially adjust the valve seat member 82 with respect to the base 84.

The valve holder 78 is secured to an end member 90 closing one end of a flexible bellows member 92. The bellows member 92 is sealed at the opposite end thereof by an end member 94 which includes a port 96 for charging the interior of the bellows 92 to a predetermined pressure. In the illustrated arrangement, the port 96 is closed by a ball seal element 98.

The end member 90 includes a tapered portion 100 located interiorly of the bellows 92. It serves as a seat for a control spring 102 located within the interior of the bellows 92. Control spring 102 has the opposite end thereof seated on an inwardly located portion 103 of the end member 94.

A control spring 104 is located within a space 106 between the cup-shaped member 48 and the inverted cup member 64. It has one end thereof in engagement with the member 48 and the opposite end thereof within the member 64 to cause the member 64 and carriage 62 to be biased in a direction toward the valve seat 44 on the base 40 of the valve cage 32. This locates a tapered nose portion 108 of a first poppet valve member 110 in seated engagement with an annular valve seat 112 formed around a restricted opening 114 through the base 116 of an outwardly located poppet valve member 118. The second poppet valve 118 includes a tapered peripheral surface 120 thereon located in sealed engagement with the valve seat 44 around the less restricted opening 46 when the carriage 62 is so positioned.

The interiorly located first poppet member 110 includes a peripheral flange 122 intermediate the ends thereof which supports one end of a control spring 124 which has the opposite end thereof supported by the inside surface of the base 116.

The flange 122 slidably engages the inner surface of a bore 126 in the poppet valve 118 so that the inner poppet valve 110 will move relative to the outer poppet upon movement of the carriage member 62 in a direction away from the base 40. Upon reaching a predetermined limit of travel, an end surface 128 on the flange 122 is moved against the inside surface of radially inwardly turned portions 130 of the valve 118. This will cause the inner poppet member 110 to lift the outer poppet 118 upwardly concurrently with further movement of the carriage member 62 so as to move the tapered surface 120 out of sealing engagement with the seat 44.

In the illustrated arrangement, the control chamber 70 of the device is in communication with the outlet pressure of the evaporator 18 from the housing inlet 28 through a pilot feed hole 132 located in the end of the member 48. It in return is in communication with the space 106 which is communicated with openings 134, 136 into the control chamber 70. Thus, the control chamber 70 is maintained at a pressure dependent upon the pressure level within the outlet of the evaporator 18.

Figure 3:
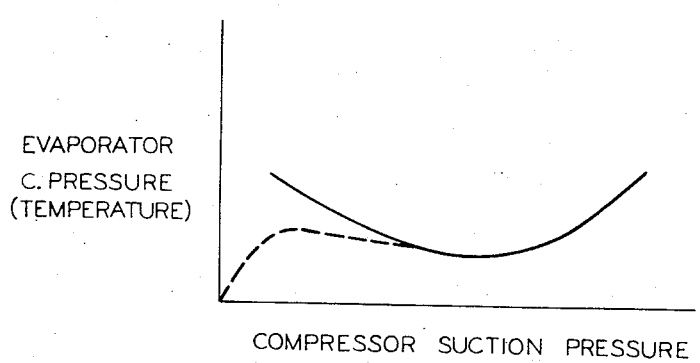
FIG. 3 is a chart showing the relationship between evaporator control pressure or temperature and the compression suction pressure as established by the control of the valve in FIG. 2.

In one working embodiment, the valve 20 is installed in an upright position with the outlet fitting 30 being located at the bottom of the valve. The valve functions to maintain the relationship between the compressor suction pressure and the evaporator control pressure in accordance with the chart shown in FIG. 3. At relatively low compressor suction pressures and at higher compressor suction pressures the valve will maintain an evaporator control pressure at pressures in excess of approximately 29 p.s.i.g. to prevent evaporator freeze. When the outlet pressure of the evaporator 18 tends to be reduced to a level at which the outer surface of the evaporator 18 will be below 32° F. thereby permitting a buildup of frost thereon the reduced pressure, the controller functions as follows. The reduced evaporator pressure is directed into the control chamber 70 via the pilot feed hole 132 and end openings 134, 136. The interior of the bellows 92 is maintained at approximately 0 p.s.i.a. With this control setting, the reduced pressure will act on the bellows 92 to cause it to expand. When this occurs, the needle valve 74 will move toward the seat 82 and will cause a pilot exhaust hole 138 through the valve seat member 82 to be closed. This increases the pressure on top of the rolling seal 56 and will produce a pressure differential acting on the carriage member 62 which will cause it to move in a direction to move the inner poppet valve member 110 against the valve seat 112 and poppet valve 118 will close. This throttles return flow to compressor 12 to restore the pressure in the evaporator thereby to prevent evaporator freeze.

The aforedescribed positive shut off is accomplished without movement of a piston with respect to a cylinder wall having control orifices therethrough. Blocking of the evaporator outlet from the suction side of the compressor will maintain the pressure therein to prevent it from being reduced below the minimum pressure point at which the evaporator outer surface will freeze.

Under conditions where there is a substantial heat load on the evaporator, the pressure in the evaporator can increase substantially. Under these conditions, the greater increase in evaporator pressure will act through the bleed hole 132 to raise the pressure in the control chamber 70 to cause bellows 92 to contract. At this point, the needle valve 74 will move from the seat 82. This will reduce the pressure in chamber 70. The greater pressure increase in the evaporator outlet and reduced pressure in chamber 70 will produce an uplifting force on the carriage member 62 which will shift the inner poppet valve member 110 upwardly sufficiently to cause the flange surface 128 to pick up the outer poppet valve at 130. This will then lift the outer poppet valve 118 to move the tapered surface 120 away from the seat 44. Thus, there will be a relatively unrestricted communication between the inlet 28 and the outlet 30 of the valve 22. This allows greater refrigerant flow through the evaporator to decrease evaporator temperature to reduce its pressure. Through reduced range of heat loads on the evaporator only the inner poppet 110 may be needed to produce a regulation of the pressure within the evaporator outlet. Under these conditions the pressure increase in the evaporator produces a further reduction and restriction between the inlet 28 and the outlet 30 of the suction throttling valve to produce a reduction of pressure within the evaporator to produce an optimum pressure conditon therein and temperature on the outer surface thereof for effectively cooling ambient air passing thereacross.

At the reduced range of heat loads the control pressure setting of the bellows 92 will maintain the pilot valve 74 closed until the pressure condition within the evaporator overcomes the action of bellows 92. At this point, the bellows pressure and spring 102 will cause the needle valve to open. This reduces the pressure in space 106 and the carriage 84 has a pressure differential thereon which moves it to open valve 110. The refrigerant flow through valve 110 is restricted by opening 114. It may meet the load requirements. Otherwise there is a sequential positioning of the pilot valve 110 and pilot valve 118 so as to reduce the pressure within the evaporator back to a level where ambient air passing across the outer surface of the evaporator will be most efficiently cooled.

In one working embodiment of the present invention, the component parts have the following mechanical ratings.

| | |
|---|---|
| Control spring 104 | 1½ lbs. per inch |
| Control spring 124 | 1½ lbs. per inch |
| Bellows control pressure | 0 p.s.i.a. |
| Bellows spring 102 | 50 lbs. per inch |

The advantage of the aforedescribed system is that it eliminates the need for a close tolerance piston and cylinder arrangement which is pressure biased into multiple control positions to throttle refrigerant flow by movement of a piston with respect to an orifice opening in the cylinder. Furthermore, it provides a stepped range of restrictions between the evaporator and compressor of an automotive air conditioning system of the type wherein the compressor is continuously driven off of the variable speed engine of the vehicle. Furthermore, the arrangement provides a positive shut off of refrigerant passing from the evaporator back to the suction during periods wherein it is desirable to maintain a pressure condition within the evaporator to prevent a frost buildup on the outer surface thereof.

While the embodiments of the present invention, as herein disclosed, constitute a preferred form, it is to be understood that other forms might be adopted.

What is claimed is as follows:

1. A suction throttling valve for regulating the pressure conditions within an evaporator unit of an automobile air conditioning system wherein the evaporator unit is connected in refrigerant flow relationship with a condenser, expansion means and an engine driven compressor comprising: a housing having an inlet and an outlet, a movable carriage in said housing having a first valve member thereon movable therewith, a second valve member movable relative to the first member and including an opening therethrough defining a first valve seat for said first valve member, means within said housing forming a less restricted opening normally closed by said second valve member, control means responsive to a first pressure condition within said evaporator to move said carriage and said first valve member out of seated engagement with the opening through said second valve member whereby flow from the inlet to the outlet of the housing is directed through said second valve member opening to produce a first restricted flow of fluid from the evaporator to the compressor for reducing the pressure therein to compensate for a first evaporator heat load, said first valve member being opened and closed against said second valve member opening to maintain the evaporator pressure above a predetermined pressure to prevent water from freezing on the outside of the evaporator, said control means responding to a second pressure condition within the evaporator produced by a greater heat load thereon and operating to move said carriage and said first valve to a second control position wherein said first valve member lifts said second valve member from a seated relationship with respect to said second less restricted opening to cause the compressor to draw more refrigerant from the evaporator to reduce the pressure therein to the desired pressure level under the greater evaporator heat load conditions.

2. A suction throttling valve for controlling pressure within the evaporator of an automotive air conditioning system comprising: a housing having an inlet adapted to be connected to the evaporator and an outlet adapted to be connected to the inlet of an engine-driven compressor; means forming a poppet valve seat at the housing outlet, means forming a pressure chamber at the housing inlet, a pilot bleed hole communicating the housing inlet and the pressure chamber, a movable member located within said housing between said inlet and outlet, said movable member having one end located within said pressure chamber and an opposite end located in overlying relationship to said valve seat, a first poppet valve element secured to said movable member for movement therewith, a second poppet valve element supported for movement on said first poppet valve element including a portion thereon engageable with said first valve seat for closing said first valve seat, said second poppet valve element having means thereon forming a second valve seat, said first poppet valve element being engageable with said second valve seat for controlling flow thereacross, means for producing a pressure differential on said movable member for moving said member into a position to cause said first poppet valve element to close against said second valve seat to close it and to move said second valve element to close said first valve seat to prevent flow of refrigerant from said housing inlet through the outlet thereof, pressure responsive means including a pilot valve responsive to a first pressure increase at the inlet of said housing to reduce the pressure within said pressure chamber to cause said movable member to shift said first poppet valve element from said second valve seat to allow a limited flow of refrigerant from said housing inlet to said housing outlet, said pressure responsive means responding to a further pressure increase at the inlet of said housing to further shift said movable member in a direction to move said second poppet valve element away from said first seat to allow greater flow of refrigerant from said housing inlet through said housing outlet, said pressure responsive means responding to a predetermined reduction of pressure in the evaporator to produce a pressure differential across said movable member to cause it to close said first and second poppet valve elements to prevent a pressure reduction in the evaporator which will cool it below a temperature at which water will freeze on the outside surface of the evaporator.

3. A two stage suction throttling valve for maintaining a minimum control pressure within the evaporator of an automotive air conditioning system of the type including a compressor discharging refrigerant into a condenser which is connected in refrigerant flow relationship through an expansion device to the inlet of the evaporator, comprising: a housing having its inlet adapted to be connected to the evaporator outlet and an outlet adapted to be connected to the suction line of the compressor, a movable carriage having a first poppet valve thereon, means forming a first unrestricted opening between the inlet and the outlet of said housing, an axially movable second poppet valve closing said first opening, said second poppet valve having a more restricted opening therein located coaxially of said first opening, said first poppet valve located interiorly of said second poppet valve including a flange member thereon movable relative with respect to said second poppet valve member, said carriage locating said first poppet member in a closed position with respect to the opening through said second poppet member and into an opened position with respect thereto, said first poppet member having a third control position, coacting means on said first poppet valve and said second poppet valve engageable when said first poppet valve is in its third control position to lift said second poppet valve from said unrestricted opening, control means for positioning said carriage in response to pressure conditions within said evaporator including means for producing a pressure differential on said carriage, said carriage responding to a first pressure differential to move said second poppet valve to communicate the housing inlet with said housing outlet through said restricted opening to produce a first pressure reduction in said evaporator to reduce the pressure therein in response to a first evaporator heat load, said control means responding to a greater pressure in said evaporator to produce a second pressure differential on said valve carriage to move it and said second poppet valve to its third control position and lift said first poppet valve from said less restricted opening to produce a less restricted fluid flow path between the inlet and outlet of said housing to produce a second reduction in pressure within the evaporator for compensating for an increased heat load on the evaporator, said control means regulating the carriage position to cause said poppet valves to close to prevent the pressure in the evaporator from being reduced below a pressure at which water will freeze on the outer surface of the evaporator.

4. A two stage suction throttling valve for maintaining a minimum control pressure within the evaporator of an automotive air conditioning system of the type including a compressor discharging refrigerant into a condenser which is connected in refrigerant flow relationship through an expansion device to the inlet of the evaporator, comprising: a housing having its inlet adapted to be connected to the evaporator outlet and an outlet adapted to be connected to the suction line of the compressor, a movable carriage having a first poppet valve thereon, means forming a first unrestricted opening between the inlet and the outlet of said housing, an axially movable second poppet valve closing said first opening, said second poppet valve having a more restricted opening therein located coaxially of said first opening, said first poppet valve located interiorly of said second poppet valve including a flange member thereon movable relative with respect to said second poppet valve member, said carriage locating said first poppet member in a closed position with respect to the opening through said second poppet member and into an opened position with respect thereto, said first poppet member having a third control position, coacting means on said first poppet valve and said second poppet valve engageable when said first poppet valve is in its third control position to lift said second poppet valve from said unrestricted opening, control means for positioning said carriage in response to pressure conditions within said evaporator including a pilot valve responsive to a first pressure condition in the evaporator to bypass refrigerant from the evaporator to the outlet of said housing when both said first and second poppet valves are in a closed position, means for producing a pressure differential on said carriage when said pilot valve bypasses said closed first and second poppet valves, said carriage responding to a first pressure differential to move said second poppet valve to communicate the housing inlet with said housing outlet through said restricted opening to produce a first pressure reduction in said evaporator to reduce the pressure therein in response to a first evaporator heat load, said control means responding to a greater pressure in said evaporator to position said pilot valve to produce a second pressure differential on said valve carriage to move it and said second poppet valve to its third control position and lift said first poppet valve from said less restricted opening to produce a less restricted fluid flow path between the inlet and outlet of said housing to produce a second reduction in pressure within the evaporator for compensating for an increased heat load on the evaporator, said control means and said pilot valve regulating the pressure bypass control action thereof to cause said poppet valves to close to prevent the pressure in the evaporator from being reduced below a pressure at which water will freeze on the outer surface of the evaporator.

* * * * *